June 8, 1954
W. M. SHOFFNER
2,680,294
HAND SHEARS FOR CUTTING SHEET METAL
Filed Oct. 4, 1951
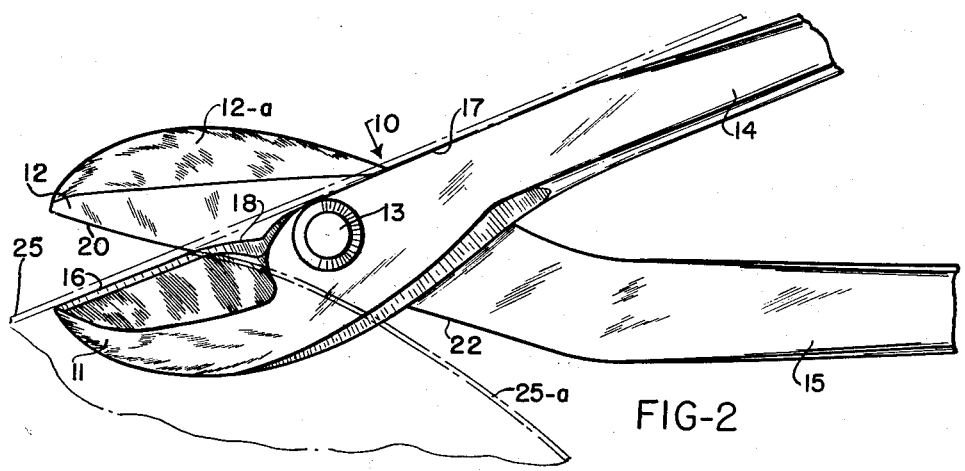
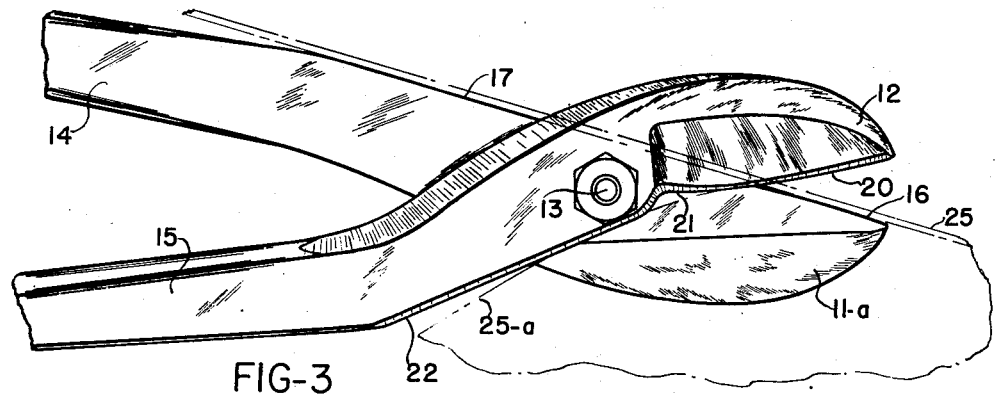
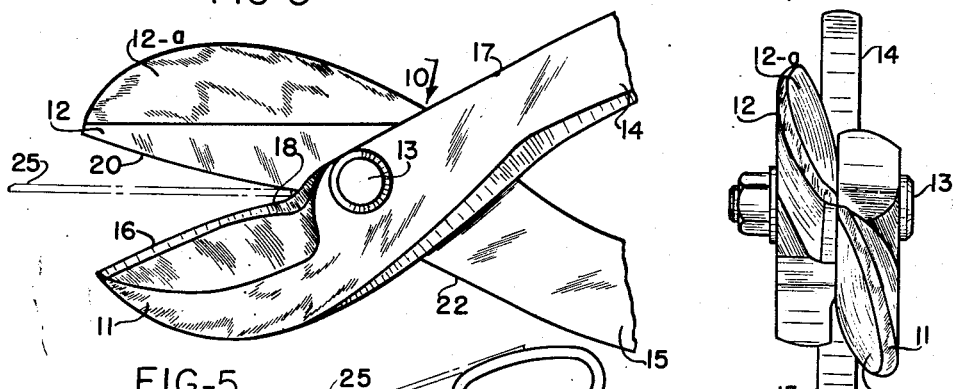
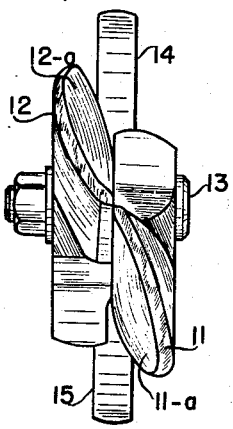
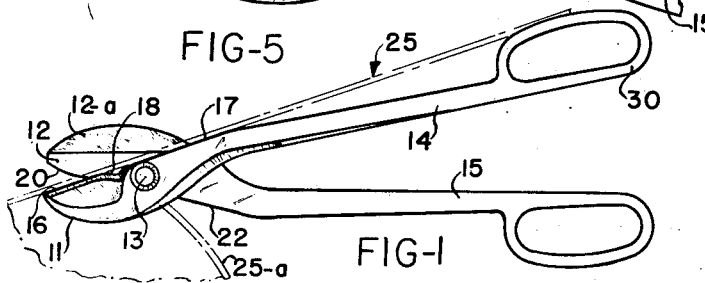
INVENTOR
WILLIE W. SHOFFNER
BY Toulmin & Toulmin
ATTORNEYS Patented June 8, 1954

2,680,294

UNITED STATES PATENT OFFICE 2,680,294

HAND SHEARS FOR CUTTING SHEET METAL

Willie M. Shoffner, Dayton, Ohio

Application October 4, 1951, Serial No. 249,707

1 Claim. (Cl. 30—254)

This invention relates to hand-operated shears, and particularly to shears used in cutting sheet metal.

One of the primary problems in shearing sheet metal, particularly heavy gage metals, is that of maintaining the metal in a flat condition. When using the ordinary sheet metal shears of the prior art, commonly known as "Tin Snips," it is well known that distortion will occur in the sheet metal on both sides of the line of shear, the metal on the left-hand side of the shear bending upwardly and the metal on the right-hand side of the shear bending downwardly, for example. The metal worker must after shearing the metal, proceed to straighten the same. But once metal has been strained by bending, it is difficult to hammer the metal into a flat condition.

Furthermore, if a sheet metal worker wishes to cut a notch into the edge of a sheet, the shears of the prior art causes substantial distortion of the sheet each time the sheet is sheared so that the result of shearing a complicated shape is such that the edge of the metal sheared is badly distorted.

It is, therefore, an object of this invention to provide hand shears, particularly for sheet metal work, that will not cause distortion of the sheet metal work, but rather the distortion is thrown into the waste portion being sheared from the sheet.

It is another object of the invention to provide hand shears constructed and arranged in such a manner that the material on one side of the shear line is retained in a flat condition, whereas the material on the opposite side of the shear line is that which is deformed by the shearing operation.

It is another object of the invention to provide hand shears in which increased leverage in a shear action is obtained by arcuately recessing the cutting edges of the blades immediately adjacent the pivot between the blades.

It is another object of the invention to provide hand shears in accordance with the foreging objects and wherein the blades are positioned angular to a plane normal to the shearing plane whereby to establish clearance between the blades and the material being sheared on one or both sides of the shear.

These and other objects will become apparent from the drawings and the following description.

In the drawings:

Figure 1 is a side elevational view of shears constructed in accordance with this invention.

Figure 2 is an enlarged side elevational view of a portion of the shears incorporating features of this invention.

Figure 3 is an enlarged side elevational view of a portion of the shears of Figure 2, but taken from the opposite side thereof.

Figure 4 is an end elevational view of the shears in closed position.

Figure 5 is a side elevational view of a portion of the shears similar to that of Figure 2, but illustrating them in wide-open position.

In this invention the shears 10 consist of a shear blade 11 and a shear blade 12 pivoted together by a pivot pin 13. The shear blade 11 has the handle 14 extending therefrom and the shear blade 12 has a corresponding handle 15.

The shear blade 11 has a shear edge 16 that is a straight edge. This straight edged shear blade 16 is linearly aligned with a flat surface 17 on the handle 14 of the shear blade. The plane extending across the surface 17 and the shear edge 16 passes the pivot 13 as closely as possible consistent with maintaining strength in the shear blade 11 at the pivot to avoid breaking of the blade at the pivot. This is for the purpose of placing the shearing edge 16 as near the axis of the pivot 13 as possible to secure as great a leverage as possible in the shear action occasioned by the edge 16.

The shearing edge 16 has a concave arcuate portion 18 immediately adjacent the pivot. This arcuate portion 18, cooperating with the opposite blade 12, provides for an increased opening of the shear, as illustrated in Figure 5, with the shearing edge increasingly close to the axis of the pivot 13 whereby to obtain maximum leverage upon initial shearing of the edge of a metal sheet or other material.

The shear blade 12 has a convex arcuate shearing edge 20 that cooperates with the straight edge 16 of the blade 11 to maintain a substantially constant shearing angle between the edges 20 and 16 during operation of the shears. The arcuate edge 20 is also recessed slightly as shown at 21 to cooperate with the recessed portion 18 at the rear end of the straight edge 16 of the shear blade 11 and thereby provide for increased opening of the shears as illustrated in Figure 5.

The handle 15 of the shear blade 12 has the relatively flat portion 22 that is angular to any tangent of the arcuate 20 of the blade 12. The relatively flat surface 22 of the blade 12 is also placed as closely as possible to the axis of the pivot 13 to place the shearing edge 20 as near in line with the axis of the pivot 13 for increasing the leverage occasioned in the shear action.

The straight edge 16 of the blade 11 comprises approximately three-fourths of the length of the combined shearing edges 16 and 18, with the convex curved edge 20 forming a substantially constant shear angle with the edge 16 throughout the extent thereof.

As shown in Figures 1, 2 and 3, when a metal sheet 25, represented by the broken lines, is sheared, that portion of the sheet resting on the shearing edge 16 passes to the left-hand side, looking from the left of Fig. 3, of the shear blade 12 and over the flat portion 17 on the handle 14 for the blade 11. Thus, with the shearing edge 16 linearly aligned with the flat portion 17, the sheet material 25 remains in a flat condition. This flat portion of the material is that which is considered the work i. e., the portion of the material which will be retained for use after cutting.

That portion of the metal sheet on the right-hand side of the blade 11 is forced downwardly by the arcuate shearing edge 20 thereby bending or distorting this part of the metal sheet as shown at 25a. The flat portion 22 of the handle 15 is engaged by the deformed portion 25a of the sheet material and urges it downwardly from the shearing plane by reason of the angularity of face 22 relative to edge 20.

It will thus be seen that all of the distortion of the material occasioned by shearing is on one side of the shear.

It will, of course, be understood that the shears 10 can be used either in the position shown in Figures 2 and 3 or in the reverse position in the event the distortion would be desired to be in an upward direction rather than in the downward direction as illustrated. This benefit from reversing the shears, that is, from having the shear blade 12 under some circumstances positioned, while in operation, below the blade 16 frequently occurs in the cutting of a V-shaped notch, for example, wherein it is desired that all of the distortion occur in the waste material removed from the notched section.

The shear blades 11 and 12 each have their blade face 11a and 12a, respectively, that faces the opposite blade angled from the opposite blade whereby to provide for clearance in shearing sheet material. This places the blades 11 and 12 angular to a plane normal to the shearing plane, as illustrated in Figure 4, this angular position of the blades 11 and 12 providing the desired clearance on both sides of the shear line to prevent the metal sheet from binding on the faces 11a and 12a of the shears.

As shown in Figure 1, the loop 30 for the handle 14 is substantially cleared by the metal sheet 25 as it passes thereover in the shearing operation, the plane of the shearing edge 16 and the surface 17 being such that the metal sheet 25 projects substantially over the loop 30. However, if slight bending occurs at this point, it is sufficiently distant from the point of shear that the flexing of the metal at this time occasions no permanent damage to the flatness of the sheet material.

While the device disclosed and described herein illustrates a preferred form of the invention, yet it will be understood that modifications can be made without departing from the spirit of the invention, and that those modifications that fall within the scope of the appended claim are intended to be included herein.

I claim:

Hand shears for use in cutting sheet metal or the like comprising first and second intersecting members, means pivotally connecting said members at the point of intersection, each member being divided into a shear blade and a handle by said pivotal means, a straight cutting edge on the shear blade of said first member, the handle of said first member comprising a planar work supporting surface adjacent to the shear blade thereof, said supporting surface being linearly aligned with the cutting edge of the shear blade of said first member, the remaining portion of the handle of said first member being slightly bent toward said second member, a loop on the free end of the handle of said first member, the angle of bend of said remaining portion of the handle of said first member being such that the outer surface of said loop is tangential with the straight line defined by said cutting edge and work supporting surface of said first member, said second member having a substantially convex shaped cutting edge on its blade, a portion of the handle of said second member adjacent to its cutting edge extending substantially straight and then being slightly bent relative to said convex cutting edge toward the handle of said first mentioned member, said substantially straight portion on the second member forming an obtuse angle with said convex cutting edge, the remaining portion of the handle of said second member being further bent toward said first member, and a loop on the free end of the handle of said second member.

References Cited in the file of this patent

UNITED STATES PATENTS

| Number | Name | Date |
| --- | --- | --- |
| 539,525 | Lyon | May 21, 1895 |
| 784,978 | Broadbooks | Mar. 14, 1905 |
| 1,062,773 | Eller | May 27, 1913 |
| 1,909,846 | Porter | May 16, 1933 |
| 2,292,271 | Heise | Aug. 4, 1942 |

FOREIGN PATENTS

| Number | Country | Date |
| --- | --- | --- |
| 10,675 | Great Britain | July 8, 1893 |